Sept. 22, 1942.  I. STEIN ET AL  2,296,654
AUTOMATIC TRANSMISSION
Filed March 7, 1941  5 Sheets-Sheet 1
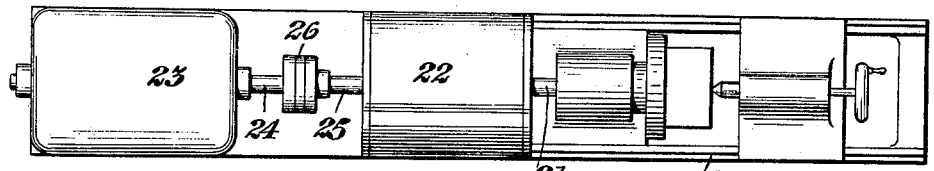
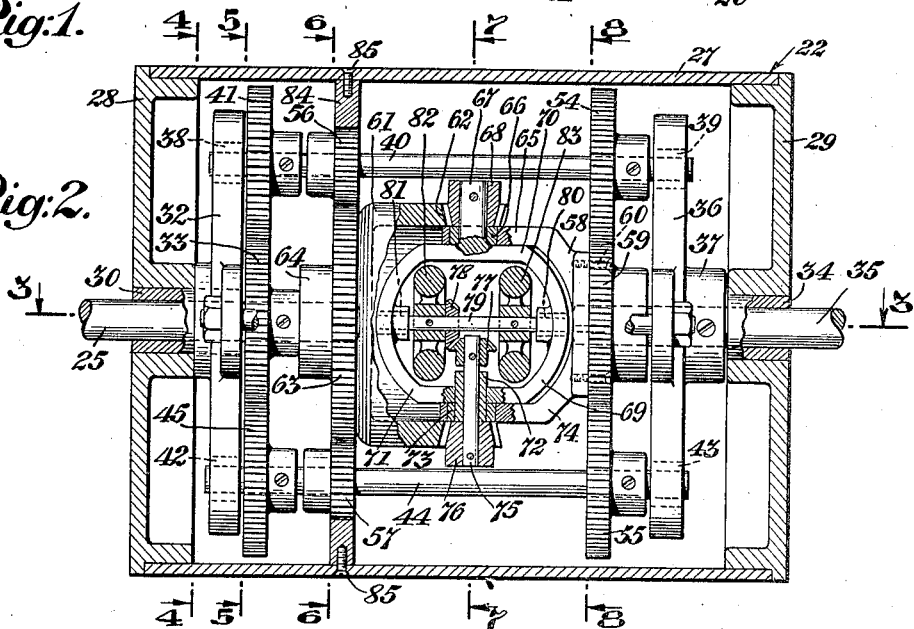
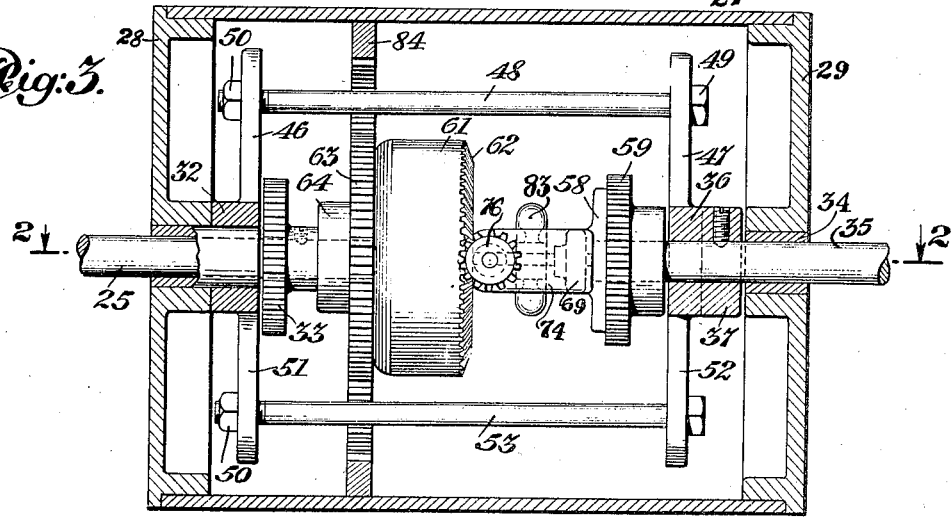
INVENTORS
Irving Stein
Max Rodin
BY
Van Deventer & Grier
ATTORNEYS.

Sept. 22, 1942.    I. STEIN ET AL    2,296,654
AUTOMATIC TRANSMISSION
Filed March 7, 1941    5 Sheets-Sheet 2

INVENTORS
Irving Stein
BY Max Rodin
Van Deventer & Grier
ATTORNEYS

Sept. 22, 1942.    I. STEIN ET AL    2,296,654
AUTOMATIC TRANSMISSION
Filed March 7, 1941    5 Sheets-Sheet 3

INVENTORS,
Irving Stein
BY Max Rodin
Van Deventer & Grier
ATTORNEYS

Sept. 22, 1942.  I. STEIN ET AL  2,296,654
AUTOMATIC TRANSMISSION
Filed March 7, 1941  5 Sheets-Sheet 4

INVENTORS
Irving Stein
Max Rodin
BY
Van Deventer + Grier
ATTORNEYS

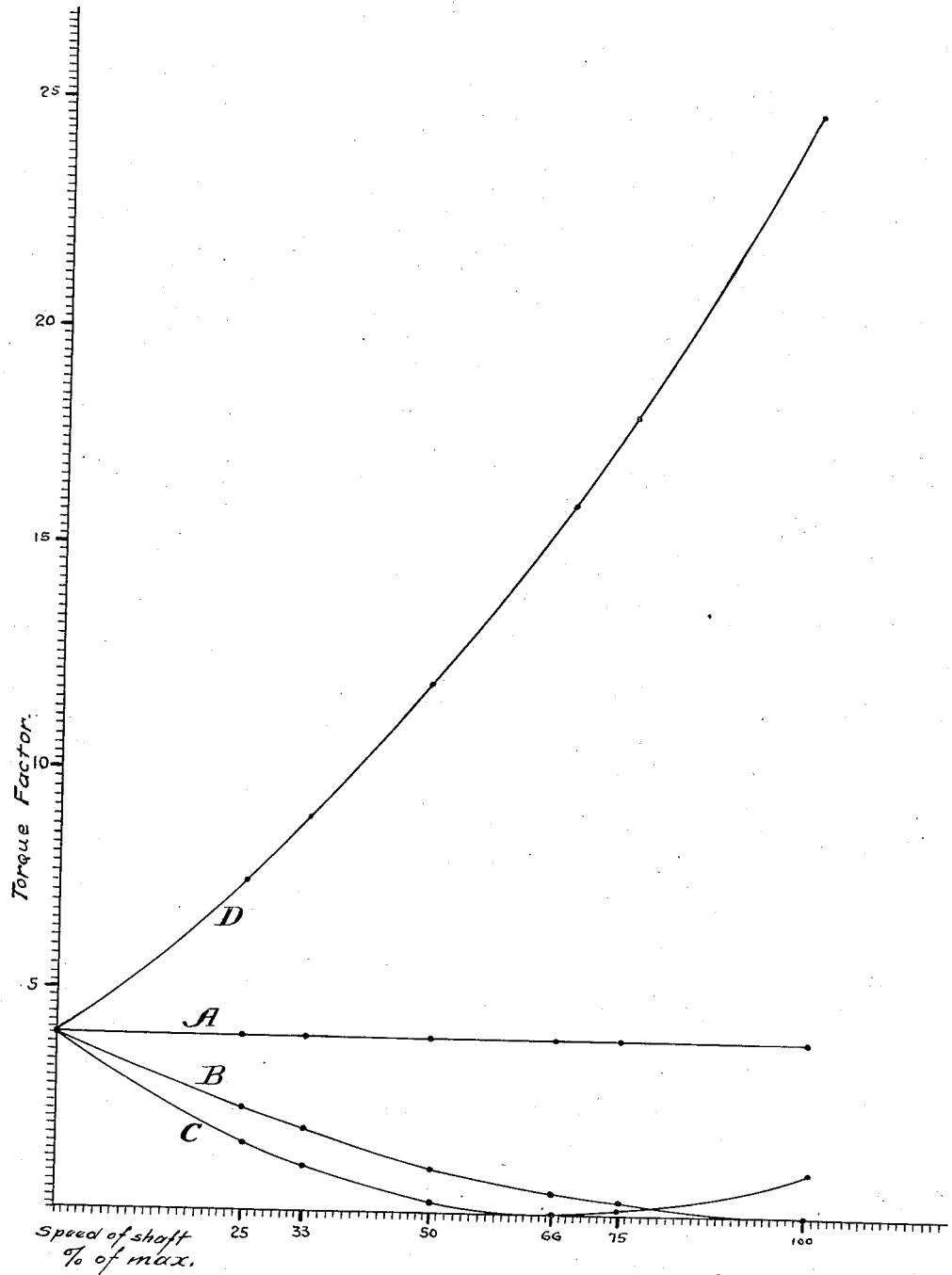

Patented Sept. 22, 1942

2,296,654

UNITED STATES PATENT OFFICE 2,296,654

AUTOMATIC TRANSMISSION

Irving Stein, Philadelphia, Pa., and Max Rodin, Louisville, Ky.

Application March 7, 1941, Serial No. 382,174

12 Claims. (Cl. 74—259)

This invention relates to improvements in automatic transmissions, and has for an object the provision of a transmission adapted to be directly connected between a driver and a driven member and, when so positioned, to drive the driven member at speeds in definite ratios to the load imposed upon the driven member.

Another object of the invention is the provision, in an automatic transmission, of a cage construction including a plurality of spur gears which are simple to construct.

A further object of the invention is the provision, in an automatic transmission, of a gyroscopic member which rotates in one direction under certain conditions, and in an opposite direction under other conditions.

Still another object of the invention is the provision, in an automatic transmission, of a drive shaft and a driven shaft with gearing therebetween so proportioned that with the drive shaft driven at a constant speed the torque of the driven shaft will increase as its speed increases.

Another object of the invention is the provision of an automatic transmission free from oscillating parts, thereby effecting smooth and quiet action in which objectionable locking devices, ratchets, or shifting devices are eliminated.

Yet another object of the invention is the provision of an automatic transmission from which an innumerable number of speeds may be obtained.

Other objects will be apparent to those skilled in the art.

Referring to the drawings:

Figure 1 is a plan view of a lathe and a motor drive with the new and improved automatic transmission positioned therebetween;

Figure 2 is a cross section of one form of the new and improved automatic transmission taken along the line 2—2 of Figure 3;

Figure 3 is a cross sectional view of the device of Figure 2 as taken along the line 3—3 of said figure;

Figure 11 is a chart showing torque curves of the device under several conditions.

Figure 4:
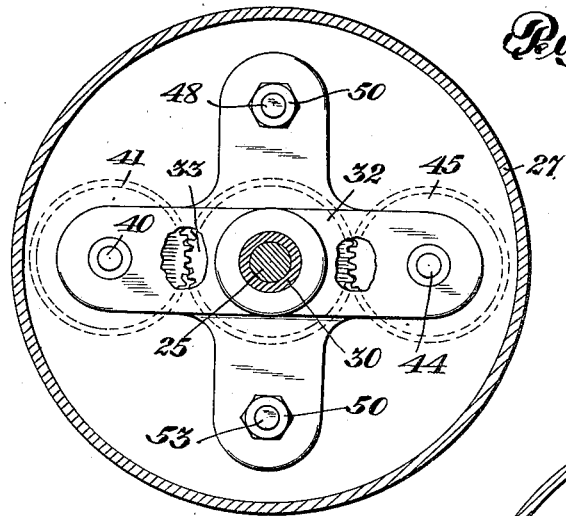
Figure 4 is a cross sectional view of the device as seen along the line 4—4 of Figure 2.
Figure 5:
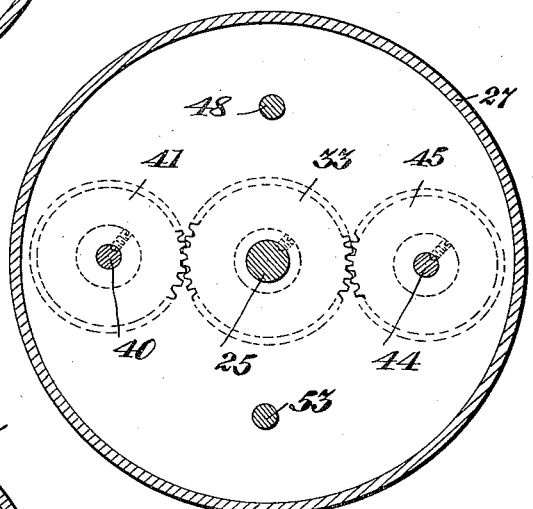
Figure 5 is a cross sectional view of the device taken along the line 5—5 of Figure 2.
Figure 6:
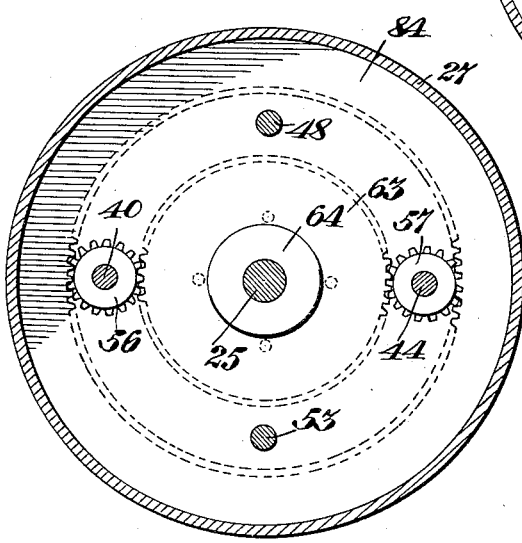
Figure 6 is a cross sectional view of the device taken along the line 6—6 of Figure 2.

In Figure 1, the lathe, diagrammatically represented by the numeral 20, has its live spindle 21 in line with and connected to the driven shaft of the transmission device generally designated by the numeral 22. An electric motor 23 has its shaft 24 in alignment with the drive shaft 25 of the device, and the shafts 24 and 25 are connected together by suitable flexible coupling 26.

Referring to Figure 2, the automatic transmission device 22 may have a tubular portion 27 fitted with end plates 28 and 29. The end plate 28 has a bearing bushing 30 therein and the drive shaft 25 is journaled therein. A spider 32 is carried on the drive shaft 25 and is free to rotate thereon. A gear 33 is also carried on the drive shaft and may be keyed, pinned or otherwise secured to said shaft in driven relation.

The end plate 29 is fitted with a bearing bushing 34 into which is journaled the driven shaft 35. A spider 36 has formed integral therewith a hub 37 which is keyed, pinned or otherwise secured in fixed relation to the shaft 35.

The spider 32 carries in one arm thereof a bearing bushing 38, and a like bearing bushing 39 is carried in an arm of the spider 36 in alignment with the bearing bushing 38. A shaft 40 is journalled in the bearings 38 and 39 and has fixed thereto, near one end thereof, a gear 41 which meshes with the gear 33. The shaft 40 also carries another gear which will presently be described.

Another arm of the spider 32 carries a bearing bushing 42, and the corresponding arm of the spider 36 carries a bearing bushing 43 in alignment with the bearing 42. A shaft 44 is journaled in the bearings 42 and 43, and has keyed or otherwise secured in fixed relation thereto a gear 45 which also meshes with the gear 33. The shaft 44 also carries other gears which will presently be described.

The spider 32 has an arm 46 which has a hole formed therein parallel to the axis of the shaft 25, and a corresponding arm 47 on the spider 36 has a like hole in alignment with the hole formed in the arm 46 and parallel to the shaft 35.

Means 48 tying the arms 46 and 47 together may be comprised of a bolt 49, passing through the arms 47 and 46 with a spacing seal thereon and secured in position by means of a nut 50. An equivalent of this arrangement would be a shouldered rod with nuts on each end.

An arm 51 on the spider 32, oppositely disposed to the arm 46, has a hole formed therein parallel to the axis of the shaft 25, and a like arm 52 is carried on the spider 36 with a hole in alignment with the hole in arm 51, and these arms are tied together by tying means 53, and thereby the arms 46 and 47 with their tying means, and the arms 51 and 52 with their tying means, form a cage.

The shaft 40 has keyed or otherwise secured thereto a spur gear 54, and the shaft 44 has a like gear 55 keyed or otherwise secured thereto. The shaft 40 also carries a spur gear 56 which is provided with a suitable bearing bushing and is free to turn thereon. The shaft 44 carries a spur gear 57 which is bushed and free to turn thereon.

A yoke member 58 has a spur gear 59 secured thereto in any suitable manner, for example by means of screws 60, and this yoke and its spur gear 59 are suitably bushed and are free to rotate on the inwardly projecting portion of the shaft 35.

A cup-shaped member 61 has a bevel gear 62 formed on its open rim. The cup-shaped member 61 also has a spur gear 63 secured to its rear portion. The cup-shaped member 61 and the gear 63 are fitted with a suitable bearing bushing which has a bearing on the inwardly projecting end of the shaft 25, and the hub 64 of the gear 63 may abut the hub of the gear 33.

The leg 65 of the yoke member 58 is provided with a bushing bearing 66, and a shaft 67 journaled in the bearing 66 has keyed thereto a beveled pinion 68. A ring-shaped member 69 has a flat side 70, and a second flat side 71 oppositely disposed to the flat side 70. The shaft 67 is shown in Figure 2 as made integral with the flat side 70. However, it may be made separately and mounted in fixed relation to the side 70.

The flat side 71 has mounted therein a bushing 72 which is in turn journaled in a bushing bearing 73 mounted in the arm 74 of the yoke 58, so that as the bevel gear 62 drives the beveled pinion 68, the ring member 69 may rotate on an axis formed on the shaft 67 and the bushing 72.

A shaft 75 is journaled in the bushing 72 and carries on its outer end a beveled pinion 76 which also meshes with the bevel gear 62. The shaft 75 carries on its inner end a mitre gear 77 which meshes with a mitre gear 78. The mitre gear 78 is carried on and keyed to a cross shaft 79 which is journaled in bearings 80 and 81 carried in the ring member 69. The shaft 79 is at right angles to the axis of the shaft 67 and the bushing 72 and has keyed thereto gyroscopic weights or fly wheels 82 and 83.

An internal gear 84 is secured to the interior of the tubular portion 27 in any suitable manner, as for example by screws 85.

The operation of the device

As the drive shaft 25 begins to rotate, the gear 33 rotates therewith, and through the medium of the gear 41 the shaft 40 and the gear 54, and also through the medium of the gear 45 the shaft 44 and the gear 55, the gear 59 is rotated and with it the yoke member 58. The gear 63, the pinions 56 and 57, and the ring gear meshed therewith, all remain stationary as the yoke member 58 rotates, the beveled pinions 68 and 76 also rotate since they are meshed with the bevel gear 62.

Due to the fact that the beveled pinion 76 is keyed to the shaft 75, this shaft also rotates, and through the medium of the mitre gears 77 and 78 the shaft 79 is rotated and with it the fly wheels or gyroscopic weights 82 and 83. The gyroscopic weights 82 and 83 and the ring member 69 rotate at a comparatively high speed due to the ratio between the bevel gear 62 and the beveled pinions 68 and 76, and therefore give a gyroscopic effect.

As the speed of the drive shaft 25 increases, fly wheels 82 and 83 and the ring member 69 rotate more rapidly and set up a force tending to slow down the yoke member 58 and hence the gear 59. As this force is increased, the cage bounded by the spiders 32 and 36 begins to rotate, and thereby the shaft 35 to which the spider 36 is keyed also begins to rotate.

As the spider rotates, the gear 59 slows down. However, the speed of the gyroscope (that is, the weights 82 and 83 and the ring 69) is maintained by the gear 63 which begins to rotate as the gears 56 and 57 are driven by the fixed internal gear 84.

As the gyroscopic force increases, the gear ratios between the driving shaft 25 and the driven shaft 35 are built up and an infinite number of speed ratios from zero to direct drive (full speed of the motor or other driving means), is obtained.

Modified form of the device

Figure 9:
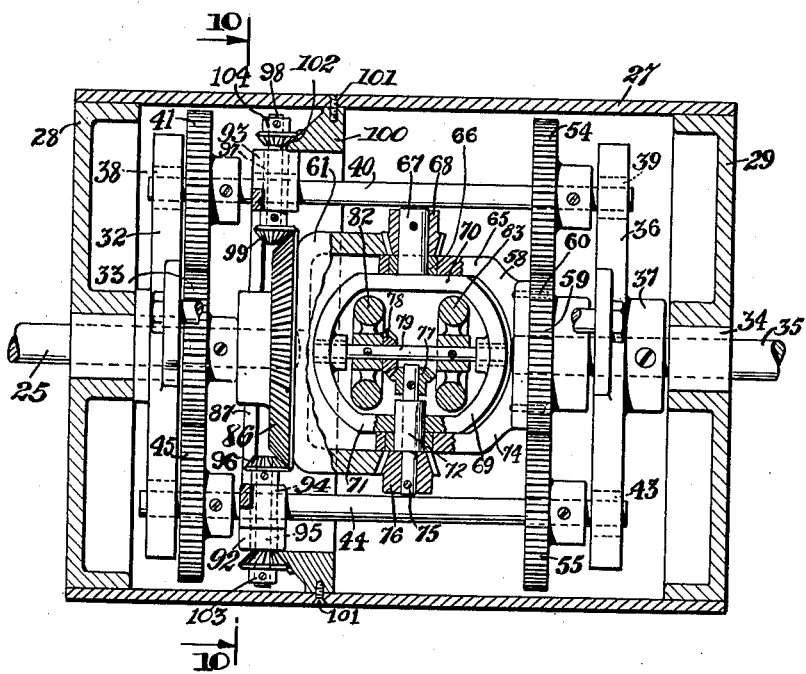
Figure 9 is a cross sectional view of a modified form of the device shown in Figure 2.
Figure 10:
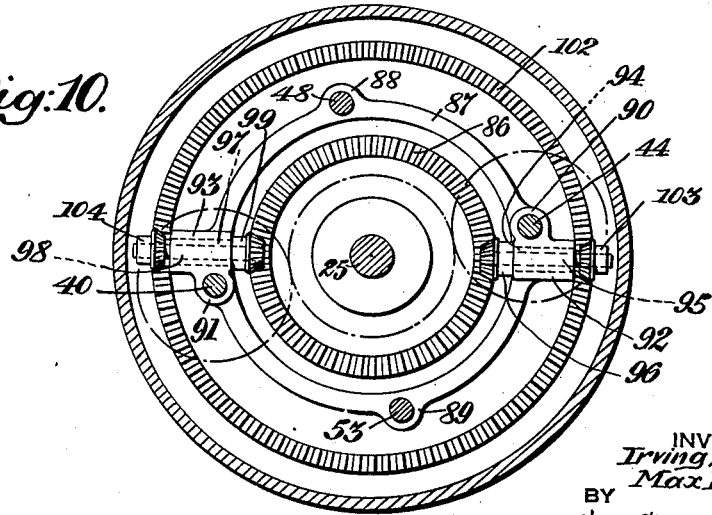
Figure 10 is a transverse cross sectional view, taken along the line 10—10 of Figure 9.

The device in its modified form, as illustrated in Figures 9 and 10, is identical with the modification shown in Figure 1 with the exception that the gear 63 which is secured to the cup-shaped member 61, has been eliminated, together with the gears 56, 57, and the internal gear 84. In place of the gear 63, is a beveled gear 86.

An annular ring member 87 has a boss 88 which embraces the tie rod 48 and an oppositely disposed boss 89 which embraces the tie rod 53. The annular ring member also has formed therein a boss 90, the interior bore of which forms a bearing on the shaft 44, and a boss 91 the interior bore of which forms a bearing on the shaft 40. The bosses 88, 89, 90 and 91 are parallel to the shaft 25. The annular ring member also carries oppositely disposed radial bosses 92 and 93.

The boss 92 has a radial hole formed therein in which is mounted a bearing bushing 94. A shaft 95 forms a working fit in the bearing 94, and carries on its inner end a beveled gear 96 which meshes with the beveled gear 86. The boss 93 is fitted with a similar bearing bushing 97 in which the shaft 98 forms a working fit. The inner end of the shaft 98 has secured thereto a beveled pinion 99 which also meshes with the beveled gear 86.

Mounted within the tubular housing 27 is a ring member 100 which is secured to the inner wall of the tubular housing in any suitable manner, for example by means of screws 101. The ring member 100 has a beveled face 102 which is toothed and forms a beveled gear.

The beveled pinion 103 is secured to the shaft 95 and meshes with the beveled gear 102. A similar beveled pinion 104 is secured to the shaft 98, and also meshes with the beveled gear 102. The beveled pinions 96 and 103 are positively keyed or otherwise secured in fixed relation to the shaft 95, and the beveled pinions 99 and 104 are keyed or otherwise secured in fixed relation to the shaft 98.

The operation of this modified form of the device is similar to that described in connection with Figures 2 to 8, except that as the cage bounded by the spiders 32 and 36 begins to rotate and the gear 59 slows down, the speed of the gyroscope is maintained by the beveled gear 86 which begins to rotate through the medium of the fixed beveled gear 102, the pinions 103, 96, on the shaft 95, and the beveled pinions 104, 99, on the shaft 98.

The torque curves shown in Figure 11 are plotted between the torque factor (based upon the moment of inertia and the speed of flywheels 82 and 83) and the percent of maximum speed of the driven shaft 35, where speed of the drive shaft 25 is constant and the speed of the driven shaft 35 is variable.

The curves A, B, C, and D are plotted under conditions where the speed of the shaft 25 is constant and the speed of the shaft 35 is variable.

The curve A represents conditions in which the gear 63 rotates at zero speed. The ratio between the beveled pinion (Figure 2) and the beveled gear is such that the speed of the two fly-wheels or gyroscopes are substantially the same. This condition may be represented by the use of our newly improved transmission in which the shaft 25 is driven by a constant speed motor, and the shaft 35 is connected to a punch press.

The curve B represents conditions in which the gear 63 rotates at the same speed and in the same direction as the shaft 35. This condition is arrived at by removing the internal gear 84 and locking the pinions 56 and 57 to the gear 63.

The curve C represents conditions in which the gear 63 rotates in the same direction as the shaft 35. The apparatus used in obtaining data for plotting this curve was like that shown in Figure 2. If the ratio between the ring gear 84 and the spur gear 63 is changed, the pitch of the curve C changes. When the ratio is increased, the torque drops (for heavy duty); when the ratio is decreased, the torque curve will assume or approach the characteristics of the curve B, and actually change the speed, but not the rotation, of the bevel gear. When the cage rotates in the direction of the drive shaft, the bevel gear rotates in the same direction but faster than the cage. The gear that holds the gyroscopes or fly-wheels, rotates at the same rate of speed as the cage. The force required by the driven shaft 35 is sufficiently high that the cage will not be allowed to turn, then the entire drive of the gyroscopic members is through the planetary gears, thereby giving the gyroscopic members two directions.

The curve D represents conditions in which the gear 86 rotates in the opposite direction to that of the shaft 35. By changing the ratio of the beveled gears so that the bevel gear 86 rotates in the direction opposite to and at a higher rate of speed than the rotation of the cage, with the drive shaft 25 rotating at a constant speed, the torque will increase as the speed of the driven shaft 35 increases.

In Figure 1, the lathe 20, as hereinbefore pointed out, has its live spindle 21 connected to the shaft 35, and as an example of the effectiveness of our new and improved automatic transmission, under actual test, we have found that the facing discs of large diameter in the lathe, the speed of the spindle varies in proportion to the size of the cut and the radius of the cut. In other words, it is possible to uniformly face a surface with the cutting tool of the lathe engaging the material being cut at substantially the same peripheral speed throughout.

The arrangement shown in Figures 9 and 10 is particularly adapted for the transmission of a motor vehicle making it possible to obtain uniformly increasing speeds without any gear changing steps therebetween, the result being that the vehicle will have an indeterminable number of speeds, without the necessity of shifting any gears.

In the arrangements shown in Figures 2 and 9, the flywheels 82 and 83 are keyed to the shaft 79. The miter gear 78 when rotated by the miter gear 77, causes the shaft 79 to rotate, and the flywheels 82 and 83 carried thereby are rotated in the same direction.

Figure 12:
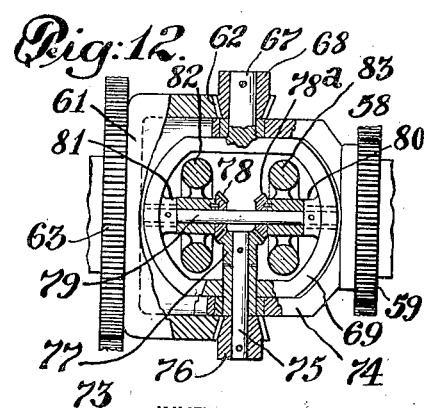
Figure 12 is a fragmentary view showing a modification of the gyroscopic weight drive.
Figure 7:
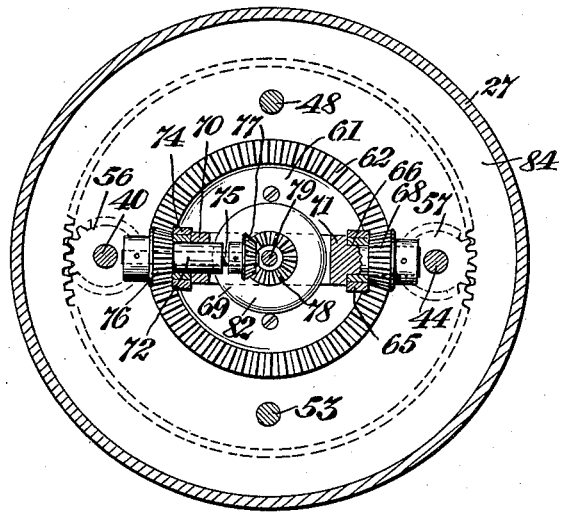
Figure 7 is a cross sectional view of the device taken along the line 7—7 of Figure 2.
Figure 8:
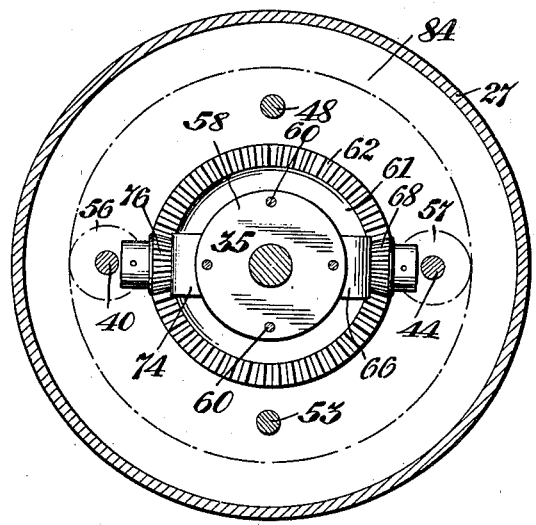
Figure 8 is a cross sectional view of the device taken along the line 8—8 of Figure 2.

Figure 12 shows a modification of this arrangement wherein the flywheels 82 and 83 are free to rotate on the shaft 79, the flywheel 82 having the miter gear 78 secured thereto as before and the flywheel 83 having a miter gear 78a secured thereto. The miter gear 77 meshes with both the miter gears 78 and 78a. The shaft 79 is keyed to the ring member 69. When the miter gear 77 is rotated, the flywheels 82 and 83 are rotated in opposite directions.

Although an embodiment of the invention and modifications of the same are herein shown and described by way of example, it is obvious that many changes can be made in the arrangements shown without departing from the spirit of the invention as set forth in the following claims.

What is claimed is:

1. In an automatic transmission, a first shaft, a train of gears associated therewith, a second shaft spaced apart endwise from said first shaft and having a train of gears associated therewith, a cage mounted on the inner ends of said shafts and keyed to one of said shafts, gyroscopic means within said cage connected to one of said trains of gears, said cage being connected to the other of said trains of gears, one of said shafts constituting a drive shaft, and the other constituting a driven shaft adapted to be driven at a speed governed by said gyroscopic means in accordance with the torque thereof.

2. In an automatic transmission, a drive shaft, a driven shaft to be driven at constantly varying speeds without steps, a cage secured to said driven shaft, a series of gear trains within said cage and connected to said drive shaft, a housing for said cage and including bearings for said shaft, a gear train between said housing and said cage, and gyroscopic means between said last gear train and one of said first gear trains for governing the speed of said cage and the driven shaft connected thereto in accordance with the torque of said last-named shaft.

3. In an automatic transmission, in combination, a stationary casing, a drive shaft journaled in said casing and extending from one end thereof, a driven shaft journaled in said casing in alignment with said drive shaft and extending from the other end of said casing, a cage having one end secured to said driven shaft and the other end journaled on said drive shaft, a gear keyed to said drive shaft, a series of gears in said cage meshing with and driven by said first gear, gyroscopic means in said cage and meshing with at least one of the gears of said series, stationary gear means in said casing, and a train of gears between said stationary gear means and said gyroscopic means, said last train including gear means carried by said cage whereby said gyroscopic means may govern the speed of said cage and said driven shaft connected thereto in accordance with the torque of said driven shaft.

4. In an automatic transmission, in combination, a stationary casing, a drive shaft journaled in said casing and extending from one end thereof, a driven shaft journaled in said casing in alignment with said drive shaft and extending from the other end of said casing, a cage having one end secured to said driven shaft and the other end journaled on said drive shaft, gyroscopic means in said cage, gearing in said cage between said gyroscopic means and said driving shaft, whereby the rotation of said drive shaft will initially rotate said gyroscopic means before said cage begins to rotate, and gearing between said gyroscopic means and said casing adapted to maintain the rotation of said gyroscopic means after said cage begins to rotate, said gyroscopic means being adapted to control the speed of said rotation of said cage and said driven shaft in accordance with the torque of said driven shaft.

5. In an automatic transmission, in combination, a stationary casing, a drive shaft journaled in said casing and extending from one end thereof, a driven shaft journaled in said casing in alignment with said drive shaft and extending from the other end of said casing, a cage having one end secured to said driven shaft and the other end journaled on said drive shaft, a gear keyed to said drive shaft, a plurality of independent shafts journaled in said cage, gearing keyed to said independent shafts and meshing with said first-mentioned gear, other gears carried on said independent shafts in spaced relation to the aforementioned gears carried thereon, gyroscopic means mounted in said cage and carrying the gear meshing with said last-mentioned gears, a spur gear associated with said gyroscopic means, pinions meshing with said spur gear and rotatably supported on said independent shafts, and a ring gear meshing with said pinions and secured to said casing, whereby said gyroscopic means is initially driven by said drive shaft through the medium of the keyed gears in said cage before the latter begins to rotate and is subsequently driven by said ring gear when the cage and the driven shaft secured thereto begin to rotate.

6. In an automatic transmission, in combination, a stationary housing, a shaft journaled in said housing adapted to be connected to a prime mover, a second shaft journaled in said housing in alignment with said first shaft and adapted to be connected to a member to be driven, a cage within said housing supported by both said shafts and keyed to said second shaft, a plurality of independent shafts journaled in said cage, gearing connecting said first shaft to said independent shafts, a rotatable support in said cage, gyroscopic means carried on said rotatable support, gearing between said independent shafts and said support, means to rotate said gyroscopic means, and a train of gearing between said means for driving said gyroscopic means and said housing, said train including at least one gear rotatably supported on one of said independent shafts.

7. An automatic transmission according to claim 6 in which the last-mentioned train of gearing exposed between said means for driving the gyroscopic means and said housing include an internal ring gear fixedly secured to said housing.

8. In an automatic transmission, in combination, a housing, a shaft journaled in said housing and adapted to be connected to a driving means, a second shaft journaled in said housing and adapted to be connected to a member to be driven, a cage within said housing and keyed to said second shaft, a third shaft journaled in said cage, gear means between said first shaft and said third shaft, a gyroscopic member within said cage, a rotatable support for said gyroscopic member mounted within said cage, gear means between said third shaft and said support and adapted to rotate the latter when said first shaft begins to turn, gear means for rotating said gyroscopic member, and other gear means between said housing and said gear means for rotating said gyroscopic member as said support slows down and said second shaft begins to rotate under control of the gyroscopic force of said gyroscopic member.

9. In an automatic transmission, in combination, a housing, a shaft journaled in said housing and adapted to be connected to a prime mover, a second shaft journaled in said housing in alignment with said first shaft and adapted to be connected to a member to be driven, a cage within said housing keyed to said second shaft and having a portion thereof overhanging and embracing a portion of said first shaft, a plurality of independent shafts journaled in said cage, gear means between said first shaft and said independent shafts, a gear within said cage and journaled on said second shaft, a yoke member secured to said last-mentioned gear, a ring member journaled in said yoke member, a gyroscopic member journaled in said ring member, gear means for rotating said gyroscopic member, gear means between said independent shafts and said gear journaled on said second shaft for rotating said yoke, and other gear means between said housing and said gear means for rotating said gyroscopic member as said yoke slows down and said cage and said second shaft connected thereto begin to rotate under control of the gyroscopic force of said gyroscopic member.

10. In an automatic transmission, a gyroscopic governing unit including a yoke, a ring member having shaft means extending from opposite sides thereof in alignment with each other and rotatably mounted in said yoke, a journal support for said yoke having an axis at a right angle to the axis of said shaft means, a shaft journaled in said ring in alignment with said first-mentioned axis, a plurality of gyroscopic weights keyed to said shaft, and means to cause said weights to rotate when said yoke is rotated, said means including gearing associated with said shaft means for causing said gyroscopic weights to continue to rotate under control of the gyroscopic force thereof after said yoke has ceased to rotate.

11. In an automatic transmission, a gyroscopic governing unit including a yoke, a ring member having shaft means extending from opposite sides thereof in alignment with each other and rotatably mounted in said yoke, a journal support for said yoke having an axis at a right angle to the axis of said shaft means, a shaft journaled in said ring in alignment with said first-mentioned axis, a plurality of gyroscopic weights keyed to said shaft, means to cause said weights to rotate when said yoke is rotating, said means including a beveled pinion secured to said shaft means, a second beveled pinion secured to said shaft, and a beveled gear meshing with said pinions, whereby when said beveled gear is stationary and said yoke is rotated, said weights are rotated by one of said pinions and said ring is rotated by the other of said pinions traversing the stationary beveled gear, and when said yoke ceases to rotate and said beveled gear begins to rotate, the weights and the ring continue to rotate.

12. In an automatic transmission, a gyroscopic governing unit including a yoke, a ring member having shaft means extending from opposite sides thereof in alignment with each other and pivotally mounted in said yoke, a shaft support for said yoke having an axis at a right angle to the axis of said shaft means, a shaft fixedly mounted in said ring in alignment with said first mentioned axis, a plurality of gyroscopic weights journaled on said shaft, and means to cause said weights to rotate in opposite directions when said yoke is rotated, said means including gearing associated with said weights for causing the latter to continue to rotate under control of the gyroscopic force thereof after said yoke has ceased to rotate.

IRVING STEIN.
MAX RODIN.